(12) United States Patent
Szili et al.

(10) Patent No.: US 10,931,503 B2
(45) Date of Patent: Feb. 23, 2021

(54) DIGITAL MODULATION TECHNIQUE

(71) Applicant: Telefonaktiebolaget LM Ericsson (publ), Stockholm (SE)

(72) Inventors: Tamas Szili, Budaors (HU); János Ladvánszky, Pomaz (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/615,878

(22) PCT Filed: Jun. 22, 2017

(86) PCT No.: PCT/EP2017/065425
§ 371 (c)(1),
(2) Date: Nov. 22, 2019

(87) PCT Pub. No.: WO2018/233835
PCT Pub. Date: Dec. 27, 2018

(65) Prior Publication Data
US 2020/0127880 A1    Apr. 23, 2020

(51) Int. Cl.
*H04L 27/36* (2006.01)
*H04L 27/34* (2006.01)
*H04L 27/38* (2006.01)

(52) U.S. Cl.
CPC ...... *H04L 27/3422* (2013.01); *H04L 27/3438* (2013.01); *H04L 27/38* (2013.01)

(58) Field of Classification Search
CPC ... H04L 27/34; H04L 27/362; H04L 27/2649; H04L 27/38; H04W 72/0473; H04W 52/262

USPC ................. 375/298, 227, 260, 320
See application file for complete search history.

(56) References Cited

U.S. PATENT DOCUMENTS

| | | | |
|---|---|---|---|
| 2010/0172443 A1* | 7/2010 | Shim | H04L 25/03331 375/320 |
| 2013/0183033 A1* | 7/2013 | Hayashi | H04J 14/00 398/43 |
| 2016/0112237 A1* | 4/2016 | Zhang | H04L 27/3405 375/261 |
| 2019/0334755 A1* | 10/2019 | Limberg | H04L 25/0224 |

OTHER PUBLICATIONS

Proakis, J., "Digital Communications", 4th Ed., Aug. 28, 2008, pp. 1-937, McGraw-Hill.

(Continued)

*Primary Examiner* — Khai Tran
(74) *Attorney, Agent, or Firm* — Coats & Bennett, PLLC

(57) ABSTRACT

A technique for performing data modulation is described. As to a method aspect of the technique, n bits of data are mapped to one modulation symbol (502) out of a modulation alphabet comprising $2^n$ modulation symbols (502). The modulation alphabet corresponds to a finite subset of a hexagonal lattice in a constellation plane (500) spanned by an in-phase value (506) and a quadrature value (508) of a signal. All modulation symbols (502) are spaced apart in the constellation plane (500) from a direct current, DC, component corresponding to zero in-phase value and zero quadrature value. The signal corresponding to the mapped modulation symbol (502) is output.

19 Claims, 11 Drawing Sheets

300

Map *n* bits of data to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of a signal, and wherein all modulation symbols are spaced apart in the constellation plane from a DC component — 302

Output the signal corresponding to the mapped modulation symbol — 304

(56) References Cited

OTHER PUBLICATIONS

Ghaith, A. et al., "Modulationwith Hexagonal Decision Regions for Wireless Communication Systems", 2013 25th International Conference on Microelectronics (ICM), Dec. 15, 2013, pp. 1-4, IEEE.
Engdahl, K. et al., "A Comparison Analysis of Hexagonal Multilevel QAM and Rectangular Multilevel QAM", Problems of Information Transmission, vol. 34 No. 4, Jan. 1, 1998, pp. 1-19, Russian Academy of Sciences.
Hosur, S. et al., "Hexagonal Constellations for Small Cell Communication", Globecom 2013—Signal Processing for Communications Symposium, Dec. 9, 2013, pp. 3270-3275, IEEE.
Wang, Q. et al., "Generation of Hexagonal 16-ary Quadrature Amplitude Modulation Signals", Asia Communications and Photonics Conference 2015 (ACP), Nov. 19, 2015, pp. 1-3, OSA.
McKilliam, R. et al., "Block Noncoherent Detection of Hexagonal QAM", 2010 Australian Communications Theory Workshop (AusCTW), Feb. 2, 2010, pp. 65-70, IEEE.
Ryan, D. et al., "Blind Detection of Hexagonal QAM in Fading Channels", Proceedings of the Eighth International Symposium on Signal Processing and Its Applications, Aug. 28, 2005, pp. 279-282, IEEE.
Forney, G. et al., "Efficient Modulation for Band-Limited Channels", IEEE Journal on Selected Areas in Communications, vol. SAC-2 No. 5, Sep. 1, 1984, pp. 632-647, IEEE.
Mow, W., "Fast Decoding of the Hexagonal Lattice with Applications to Power Efficient Multi-Level Modulation Systems", Proceedings Singapore ICCS/ISITA 1992, Jan. 1, 1992, pp. 370-373, IEEE.

\* cited by examiner

100

200

1200

1300

DIGITAL MODULATION TECHNIQUE

TECHNICAL FIELD

The present disclosure relates to a technique for digital modulation and digital demodulation.

BACKGROUND

In order to transmit digital data over a radio channel or to store the digital data on an continuous medium, such as the film of ferromagnetic material on a hard disc, the digital data has to be modulated for transfer over an analog bandpass channel, for example over the limited radio frequency band of the radio channel. By frequency-division multiplexing (FDM), particularly orthogonal FDM (OFDM) using Fourier transformation, several of such low-pass information signals can be combined into a baseband signal of a defined bandwidth and transferred simultaneously over the same physical medium using separate subcarriers.

All modulation schemes, including quadrature amplitude modulation (QAM), convey digital data by changing some aspect of a carrier signal according to the digital data. In the case of QAM, the amplitude of two waves of the same frequency, 90° out-of-phase with each other (in quadrature) are changed, i.e., modulated, to represent the digital data. Amplitude modulating two carriers in quadrature can be equivalently viewed as both amplitude modulating and phase modulating a single carrier.

Rectangular QAM constellations, such as 16-QAM, are in general sub-optimal in the sense that they do not maximally space the constellation points for a given energy. The wide-spread usage of rectangular QAM is due to its simple implementation as two pulse amplitude modulation signals on quadrature carriers for transmission, and its simple demodulation. Circular QAM achieves a marginally better bit-error rate (BER) compared to rectangular QAM, but circular QAM is harder to modulate and demodulate.

SUMMARY

Accordingly, there is a need for an efficiently implemented modulation technique that can reduce the bit error rate.

As to one aspect, a method of performing digital modulation is provided. The method comprises or triggers a step of mapping n bits of data to one modulation symbol out of a modulation alphabet comprising $2^n$ modulation symbols. The modulation alphabet corresponds to a finite subset of a hexagonal lattice in a constellation plane spanned by an in-phase value and a quadrature value of a signal. All modulation symbols are spaced apart in the constellation plane from a direct current (DC) component corresponding to zero in-phase value and zero quadrature value. The method further comprises or triggers a step of outputting the signal corresponding to the mapped modulation symbol.

Each modulation symbol in the modulation alphabet may correspond to one node of the hexagonal lattice. Since the modulation alphabet is finite, not all nodes of the hexagonal lattice may correspond to a modulation symbol in the modulation alphabet.

The technique may be advantageously implemented with low complexity, e.g., as to hardware resources and/or computational complexity. The low complexity may be realized by a low number of bits, n.

The number of bits, n, may be equal to or less than 4 (e.g., 2, 3 or 4). The number of modulation symbols may be equal to or less than 16 (e.g., 4, 8 or 16). The number of modulation symbols in the modulation alphabet may be a power of two, e.g. $2^n$ or $2^{n+m}$ including m parity bits in the mapping.

The data that is subjected to the digital modulation may be referred to as digital data. Alternatively or in addition, the term "digital data" may refer to data that represents the n bits and/or is representable by the n bits.

The signal may be, or may be part of, a baseband signal. The step of outputting may include transmitting the baseband signal on a radio carrier, e.g., as a symbol on an Orthogonal Frequency-Division Multiple Access (OFDMA) subcarrier. Alternatively or in addition, the step of outputting the signal may include storing the mapped modulation symbols in a classical I-Q-state, e.g., recorded on a ferromagnetic surface layer, or in a complex-valued quantum state.

The $2^n$ modulation symbols may be in a rhombus. The convex hull of all modulation symbols may be a rhombus. Each node of the hexagonal lattice at an edge of the rhombus may correspond to one of the modulation symbols of the modulation alphabet. Only the nodes on the edges (i.e., including the vertices) of the rhombus may correspond to modulation symbols of the modulation alphabet, e.g., for n=2 and n=3. Further nodes within the rhombus (e.g., within the edges of the rhombus), except for the DC component, may also correspond to modulation symbols of the modulation alphabet, e.g., for n equal to or greater than 4.

The DC component may correspond to the center of the rhombus, e.g., irrespective of whether or not the DC component, i.e., the center of the rhombus, is a node of the hexagonal lattice.

The modulation alphabet may be symmetric in the constellation plane with respect to an in-phase axis through the DC component and/or a quadrature axis through the DC component. Consequently, the rhombus may be symmetric in the constellation plane with respect to the in-phase axis and/or the quadrature axis.

The mapping may use a Gray code, e.g., a one-dimensional Gray code for n bits or a two-dimensional Gray code for n bits. The n bits may be mapped (bijectively) to the modulation symbol using the one-dimensional Gray code, e.g., row-by-row or along a meander path uniquely connecting all modulation symbols in the modulation alphabet. Alternatively or in addition, the n bits may be mapped (bijectively) to the modulation symbol using the two-dimensional Gray code, wherein the edges of the rhombus define the two directions along which the two-dimensional Gray code is applied.

The Gray code may be cyclic and/or binary-reflected. Furthermore, codes other than Gray codes may be used for the technique, e.g., for the mapping step. The codes can modify properties of the modulation.

Each of the modulation symbols in the modulation alphabet may have 2, 3, 4 or 6 next neighbors. For n=2, each of the modulation symbols in the modulation alphabet may have 2 next neighbors. For n=3, each of the modulation symbols in the modulation alphabet may have 2 or 3 next neighbors. For n=4, each of the modulation symbols in the modulation alphabet may have 2, 3, 4 or 6 next neighbors.

Each of the modulation symbols in the modulation alphabet may have at least two next-neighboring modulation symbols in the constellation plane, which differ by only one of the n bits. Alternatively or in addition, each of the modulation symbols in the modulation alphabet may have at least half of its next-neighboring modulation symbols differing by only one of the n bits. More specifically, each of the modulation symbols in the modulation alphabet may have at least two thirds of its next neighbors differing by only one of the n bits. For n=2, each of the modulation symbols in the modulation alphabet may have all of its next neighbors differing by only one of the n bits. For n=3 or n=4, each of the modulation symbols in the modulation alphabet may have at least two thirds of its next neighbors differing by only one of the n bits.

Each of the modulation symbols in the modulation alphabet may have all of its next-neighboring modulation symbols differing by only one or two of the n bits.

The modulation alphabet may correspond to a finite subset of a hexagonal Bravais lattice. The Bravais lattice may be spanned by 2 basis vectors in the constellation plane. Each of the hexagonal Bravais lattice may (e.g., up to a shift of the modulation alphabet) correspond to a different integer linear combination of two basis vectors (also: primitive vectors). The two basis vectors, $a_i=(I_i, Q_i)$, i=1, 2, of the modulation alphabet may include any two of:

(1, 0), (½, sqrt(3)/2), (0, sqrt(3)) and (−½, sqrt(3)/2).

Furthermore, I and Q may be interchanged.

The mapping may use a two-dimensional Gray code along the 2 basis vectors, e.g., along the 2 basis vectors that are parallel to edges of the rhombus.

The number of bits, n, may be even. The triangular lattice may be shifted relative to the DC component by half of one of the basis vectors, e.g., by a mean value between the 2 basis vectors that are parallel to edges of the rhombus. Alternatively or in addition, the DC component may correspond to a midpoint between two next-neighboring modulation symbols.

Next neighbors of the modulation symbols in the constellation plane along the 2 basis vectors differ by only one of the n bits, e.g., for n=2 bits or 4 modulation symbols, or for n=3 bits or 8 modulation symbols.

For n being even, the hexagonal lattice may be shifted relative to the DC component by half of any of the basis vectors. The hexagonal lattice and the DC component may define a point set, wherein the Voronoi tessellation (e.g., a Voronoi diagram) of the point set is used for determining the received bits, i.e., for demodulating the output signal.

The DC component may correspond to a node of the hexagonal lattice. For n being odd, the hexagonal lattice may be centered to the DC component and/or may include the DC component. The node of the hexagonal lattice corresponding to the DC component may not correspond to a modulation symbol in the modulation alphabet.

The hexagonal lattice may also be referred to as triangular lattice. For example, the hexagonal lattice may be covered by congruent triangles.

As to another aspect, a method of performing digital demodulation is provided. The method comprises or triggers a step of receiving a signal corresponding to n bits of data. The further comprises or triggers a step of mapping the received signal to one modulation symbol out of a modulation alphabet comprising $2^n$ modulation symbols. The modulation alphabet corresponds to a finite subset of a hexagonal lattice in a constellation plane spanned by an in-phase value and a quadrature value of the signal. All modulation symbols are spaced apart in the constellation plane from a direct current (DC) component corresponding to zero in-phase value and zero quadrature value.

The mapping of the signal to one of the modulation symbols may imply or correspond to determining the n bits of data. Alternatively or in addition, n soft bits may be determined, e.g., based on a distance in the constellation plane between the received signal and the mapped modulation symbol.

The mapping may be based on decision lines (or decision boundaries) in the constellation plane according to a Voronoi tessellation of the hexagonal lattice. A tile of the Voronoi tessellation including the DC component may be not mapped to any of the modulation symbols. In case the DC component is not a node of the hexagonal lattice (e.g., in case the hexagonal lattice is shifted relative to the DC component), the DC component may be included in the lattice for the purpose of the Voronoi tessellation.

The method according to the above other aspect may further comprising any feature and/or any step of the first-mentioned one method aspect, or any feature and/or any step corresponding the features and steps of the first-mentioned one method aspect.

The one or the other method aspect may be performed by one or more nodes of a telecommunications network (e.g., a core network, CN, or a radio access network, RAN), for example in a distributed manner. Alternatively or in addition, the one or the other method aspect may be performed by a radio device, e.g., a device configured for accessing the RAN.

The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Alternatively or in addition, the node of the telecommunications network, e.g., of the RAN, may be embodied as a radio access node. Examples for the radio access node may include a base station (e.g., a 3G base station or Node B, 4G base station or eNodeB, or a 5G base station or gNodeB), an access point (e.g., a Wi-Fi access point) and a network controller (e.g., according to Bluetooth, ZigBee or Z-Wave).

The telecommunications network, e.g., the RAN, may provide radio access, e.g., according to the Global System for Mobile Communications (GSM), the Universal Mobile Telecommunications System (UMTS), Long Term Evolution (LTE) or New Radio (NR). The technique may be implemented on a Physical Layer (PHY), a Medium Access Control (MAC) layer, a Radio Link Control (RLC) layer and/or a Radio Resource Control (RRC) layer of a protocol stack for the radio access.

As to further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., in the telecommunications network and/or via the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to still further aspect, a device for performing digital modulation is provided. The device is configured to perform the one method aspect. Alternatively or in addition, the device may comprise a mapping unit configured to mapping n bits of data to one modulation symbol out of a modulation alphabet comprising $2^n$ modulation symbols. The modulation alphabet corresponds to a finite subset of a hexagonal lattice in a constellation plane spanned by an in-phase value and a quadrature value of a signal. All modulation symbols are spaced apart in the constellation plane from a direct current (DC) component corresponding to zero in-phase value and zero quadrature value. The device may further comprise an outputting unit configured to output the signal corresponding to the mapped modulation symbol.

As to a still further device aspect, a device for performing digital modulation is provided. The device comprises at least one processor and a memory. Said memory comprises instructions executable by said at least one processor whereby the device is operative to map n bits of data to one modulation symbol out of a modulation alphabet comprising $2^n$ modulation symbols. The modulation alphabet corresponds to a finite subset of a hexagonal lattice in a constellation plane spanned by an in-phase value and a quadrature value of a signal. All modulation symbols are spaced apart in the constellation plane from a direct current (DC) component corresponding to zero in-phase value and zero quadrature value. Execution of the instructions further causes the device to be operative to output the signal corresponding to the mapped modulation symbol.

As to a still further aspect, a device for performing digital modulation is provided. The device may comprise one or more modules for performing the one method aspect. Alternatively or in addition, the device comprises a map module for mapping n bits of data to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of a signal, and wherein all modulation symbols are spaced apart in the constellation plane from a direct current (DC) component corresponding to zero in-phase value and zero quadrature value. The device further comprises an output module for outputting the signal corresponding to the mapped modulation symbol.

As to a still further aspect, a device for performing digital demodulation is provided. The device is configured to perform the other method aspect. Alternatively or in addition, the device may comprise a receiving unit configured to receive a signal corresponding to n bits of data. The device may further comprise a mapping unit configured to map the received signal to one modulation symbol out of a modulation alphabet comprising $2^n$ modulation symbols. The modulation alphabet corresponds to a finite subset of a hexagonal lattice in a constellation plane spanned by an in-phase value and a quadrature value of the signal. All modulation symbols are spaced apart in the constellation plane from a direct current (DC) component corresponding to zero in-phase value and zero quadrature value.

As to a still further aspect, a device for performing digital demodulation is provided. The device comprises at least one processor and a memory, said memory comprising instructions executable by said at least one processor, whereby the device is operative to receive a signal corresponding to n bits of data. Execution of the instructions further causes the device to be operative to map the received signal to one modulation symbol out of a modulation alphabet comprising $2^n$ modulation symbols. The modulation alphabet corresponds to a finite subset of a hexagonal lattice in a constellation plane spanned by an in-phase value and a quadrature value of the signal. All modulation symbols are spaced apart in the constellation plane from a direct current (DC) component corresponding to zero in-phase value and zero quadrature value.

As to a still further aspect, a device for performing digital demodulation is provided. The device may comprise one or more modules for performing the other method aspect. Alternatively or in addition, the device comprises a reception module for receiving a signal corresponding to n bits of data. The device further comprises a map module for mapping the received signal to one modulation symbol out of a modulation alphabet comprising $2^n$ modulation symbols. The modulation alphabet corresponds to a finite subset of a hexagonal lattice in a constellation plane spanned by an in-phase value and a quadrature value of the signal. All modulation symbols are spaced apart in the constellation plane from a direct current (DC) component corresponding to zero in-phase value and zero quadrature value.

The devices may further include any feature disclosed herein in the context of the method aspects. Particularly, any one of the units and modules, or a dedicated unit or module, may be configured to perform or trigger one or more of the steps of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof (e.g. LTE-A or LTE-LAA), Wireless Local Area Network (WLAN) according to the standard family IEEE 802.11 and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
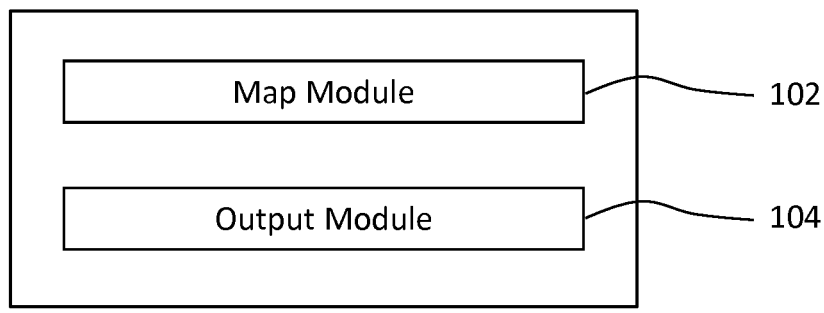
FIG. 1 shows a schematic block diagram for an embodiment of a device for performing digital modulation, which may be implemented in a transmitting node.

FIG. 1 schematically illustrates a block diagram for an embodiment of a device for performing digital modulation, which device is generically referred to by reference sign 100.

The device 100 comprises a map module 102 for mapping n bits of data to one modulation symbol out of a modulation alphabet comprising 2 to the n modulation symbols. The modulation alphabet corresponds to a finite subset of a hexagonal lattice in a constellation plane (or constellation diagram) spanned by an in-phase value (I) and a quadrature value (Q) of a signal. All modulation symbols are spaced apart in the constellation plane from a direct current (DC) component corresponding to zero for the in-phase value and zero for the quadrature value.

An output module 104 of the device 100 outputs the signal corresponding to the mapped modulation symbol, e.g., for radio transmission and/or for data storage.

Figure 2:
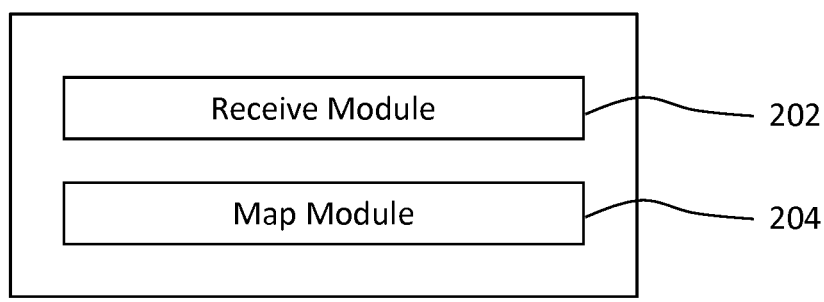
FIG. 2 shows a schematic block diagram for an embodiment of a device for performing digital demodulation, which may be implemented in a receiving node.

FIG. 2 schematically illustrates a block diagram of a device for performing digital demodulation, which device is generically referred to by reference sign 200.

The device 200 comprises a receive module 202 for receiving a signal corresponding to n bits of data. The device 200 further comprises a map module for mapping the received signal to one modulation symbol out of a modulation alphabet comprising 2 to the n modulation symbols. The modulation alphabet corresponds to a finite subset of a hexagonal lattice in a constellation plane (or constellation diagram) spanned by an in-phase value (I) and a quadrature value (Q) of the signal. All modulation symbols of the modulation alphabet are spaced apart in the constellation plane from a (DC) component corresponding to zero in-phase value and zero quadrature value.

The device 100 may be implemented at a transmitting node. The device 200 may be implemented at a receiving node. The transmitting node and the receiving node may be a base station or a mobile station.

The devices 100 and 200 may communicate according to a 3GPP system or a non-3GPP system (e.g., Wi-Fi). The 3GPP system may comprise at least one of a General Packet Radio Service (GPRS), a Universal Mobile Telecommunications System (UMTS), an Evolved Packet System (EPS), a Next Generation System (NGS) and a Fifth Generation System (5GS). The base station may be an evolved Node B (eNodeB or eNB) or a Next Generation Node B (gNodeB or gNB). The mobile station may be user equipment (UE), including a connected road vehicle, a device for machine-to-machine (M2M) communication or machine-type communication (MTC).

Figure 3:
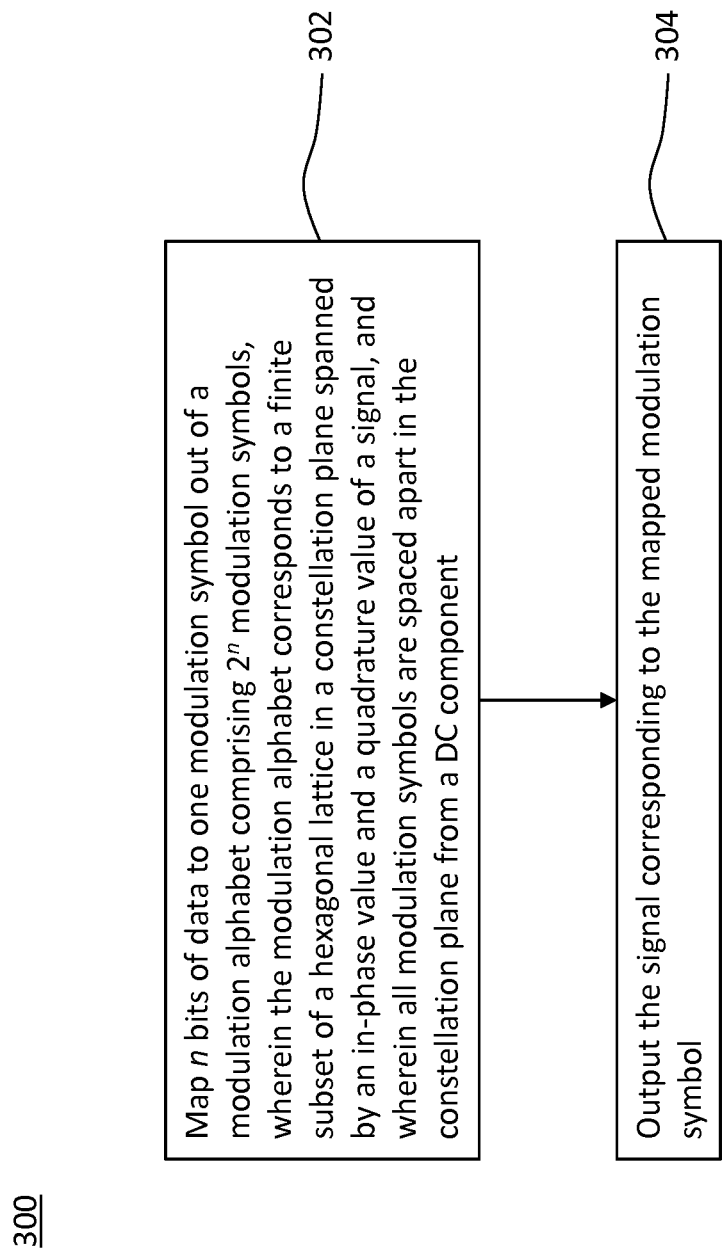
FIG. 3 shows a flowchart of a method embodiment for performing digital modulation, which may be implemented in a transmitting node.

FIG. 3 shows a flowchart for a method 300 of performing digital modulation. In a step 302 of the method 300, n bits of data (e.g., out of a code block) are mapped to one modulation symbol out of a modulation alphabet comprising 2 to the n modulation symbols. The modulation alphabet corresponds to a finite subset of a hexagonal lattice in a constellation plane spanned by an in-phase value (I) and a quadrature value (Q) of a signal. All modulation symbols of the modulation alphabet are spaced apart in the constellation plane from a direct current (DC) component corresponding to zero in-phase value and zero quadrature value. In a step 304, the signal corresponding to the mapped modulation symbol is output, e.g., for radio transmission and/or data storage.

Figure 4:
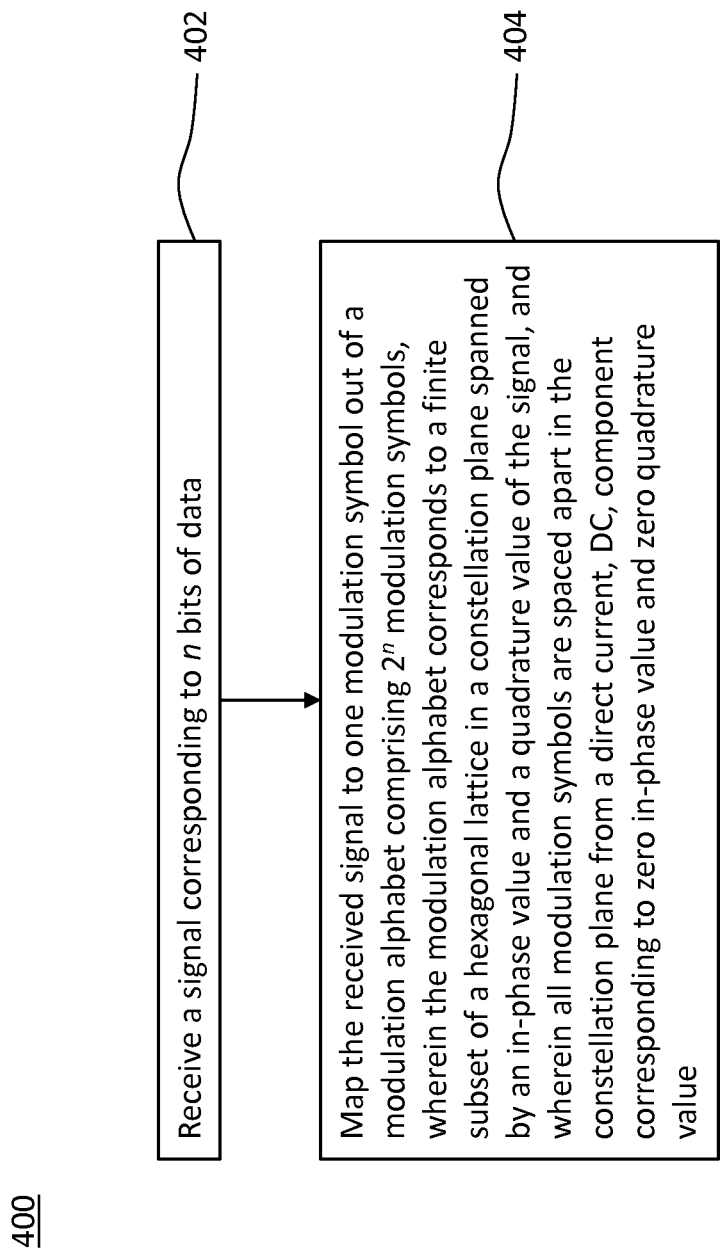
FIG. 4 shows a flowchart of a method embodiment for performing digital demodulation, which may be implemented in a receiving node.

FIG. 4 shows a flowchart for a method 400 of performing digital demodulation. A signal corresponding to n bits of data is received in a step 402. The received signal is mapped in a step 404 to one modulation symbol out of a modulation alphabet comprising 2 to the n modulation symbols. The modulation alphabet corresponds to a finite subset of a hexagonal lattice in a constellation plane spanned by an in-phase value (I) and a quadrature value (Q) of the signal. All modulation symbols of the modulation alphabet are spaced apart in the constellation plane from a direct current (DC) component corresponding to zero in-phase value and zero quadrature value.

Figure 5:
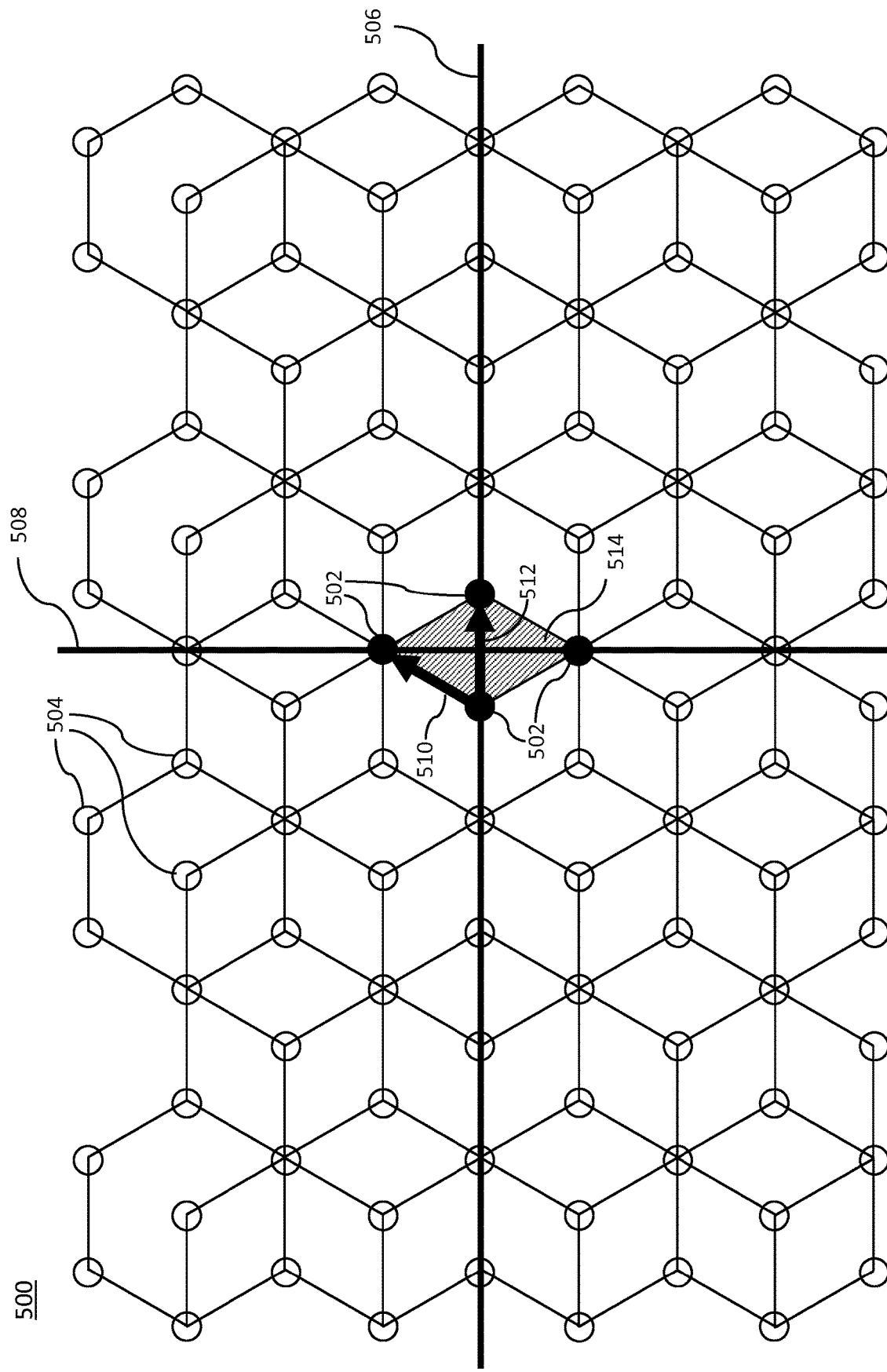
FIG. 5 schematically illustrates modulation symbols in a constellation plane according to a first implementation of the technique.

FIG. 5 schematically illustrates a constellation plane 500 representing the modulation symbols 502 according to a first implementation of the technique for n=2 bits of data. The I values are plotted from left to right. The Q values are plotted from bottom to top. The modulation symbols 502 are arranged symmetrically with respect to both the I-axis 506 and the Q-axis 508.

The modulation alphabet comprises $2^n=4$ modulation symbols 502. This constellation of modulation symbols 502 defining a modulation alphabet is also referred to as 4-star modulation. In the constellation plane 500, the modulation symbols 502 of the modulation alphabet correspond to a subset of a hexagonal lattice 504. Two basis vectors 510 and 512 span the hexagonal lattice. That is, the hexagonal lattice is a two-dimensional Bravais lattice including all integer combination of the two basis vectors 510 and 512. The hexagonal lattice is shifted relative to the origin, i.e. the DC component (I, Q)=(0, 0), by half of one of the basis vectors, e.g., the basis vector 512 in FIG. 5. Other combinations of two basis vectors can span the same hexagonal lattice.

The convex hull of the modulation symbols 502 is a rhombus 514.

The n=2 bits of data are mapped to the modulation symbols 502 according to a Gray code. For example, the $2^n=4$ modulation symbols 502 may be associated with the bits [00], [01], [11], [10] in clockwise or counter-clockwise order about the DC component (starting with any one of the modulation symbols 502).

Figure 6:
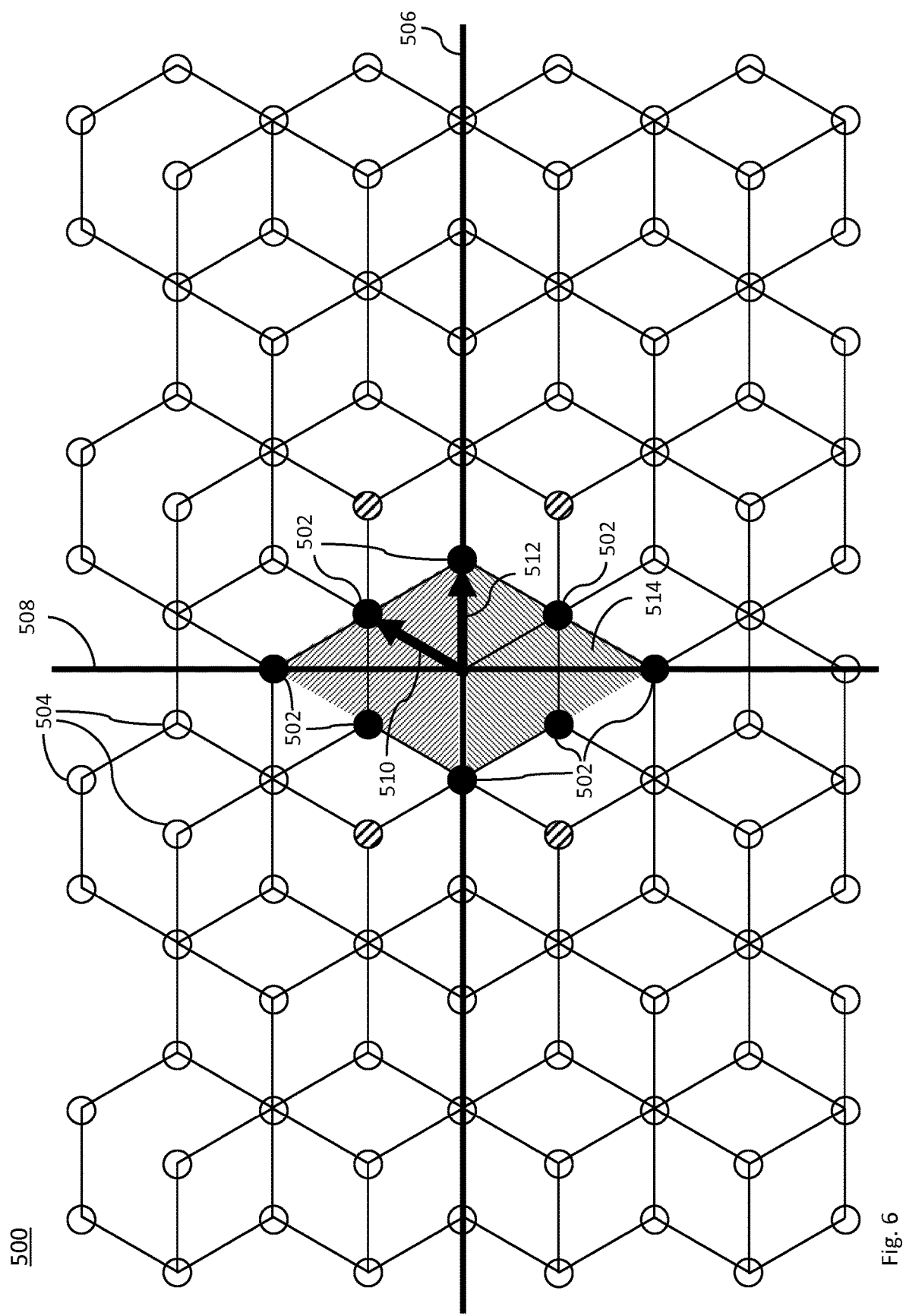
FIG. 6 schematically illustrates modulation symbols in a constellation plane according to a second implementation of the technique.

FIG. 6 schematically illustrates a constellation plane 500 representing the modulation symbols 502 (shown as full circles in FIG. 6) according to a second implementation of the technique for n=3 bits of data. The I values are plotted from left to right. The Q values are plotted from bottom to top. The modulation symbols 502 are arranged symmetrically with respect to both the I-axis 506 and the Q-axis 508.

The modulation alphabet comprises $2^n=8$ modulation symbols 502. This constellation of modulation symbols 502 defining a modulation alphabet is also referred to as 8-star modulation. In the constellation plane 500, the modulation symbols 502 of the modulation alphabet correspond to a subset of a hexagonal lattice 504 (shown as any of the circles in FIG. 6). Two basis vectors 510 and 512 span the hexagonal lattice 504. That is, the hexagonal lattice is a two-dimensional Bravais lattice including all integer combination of the two basis vectors 510 and 512. Other combinations of two basis vectors can span the same hexagonal lattice.

The hexagonal lattice is not shifted relative to the origin, i.e. the DC component (I, Q)=(0, 0) is a node of the hexagon lattice 504. The DC component is not modulation symbol 502 of the modulation alphabet.

The convex hull of the modulation symbols 502 is a rhombus 514. Other nodes of the hexagonal lattice, which are achievable within the same power level (shown as dashed circles in FIG. 6) are not modulation symbols 502 of the modulation alphabet, e.g. to the benefit of a mapping the data to the modulation symbols 502 using a Gray code.

The n=3 bits of data are mapped to the modulation symbols 502 according to a Gray code. For example, the $2^n=8$ modulation symbols 502 may be associated with the bits [000], [001], [011], [010], [110], [111], [101] and [100] in clockwise or counter-clockwise order about the DC component (starting with any one of the modulation symbols 502).

In the mapping step 302, the device 100 may directly use the modulation symbols 502 according to any implementation.

For demodulating the received signal, the device 200 may use decision boundaries at equal distance between next-neighboring modulation symbols 502. The decision boundaries may correspond to a Voronoi tessellation of the constellation plane 500 based on the modulation symbols 502. Optionally, for the purpose of determining the decision boundaries by Voronoi tessellation, the DC component may be included in the point set of the Voronoi tessellation, so that a section centered at the DC component is excluded from the mapping in the step 404. This section is not mapped to any modulation symbol 502.

For n being even, the excluded section is a smaller rhombus, with half the edge length of the rhombus 514 in FIG. 5 (that is, the rhombus 514 for n=2) centered at the DC component. For n being odd, the excluded section is a smaller hexagon, with half the edge length of the primitive hexagon of the hexagonal lattice 504, centered at the DC component.

Figure 7:
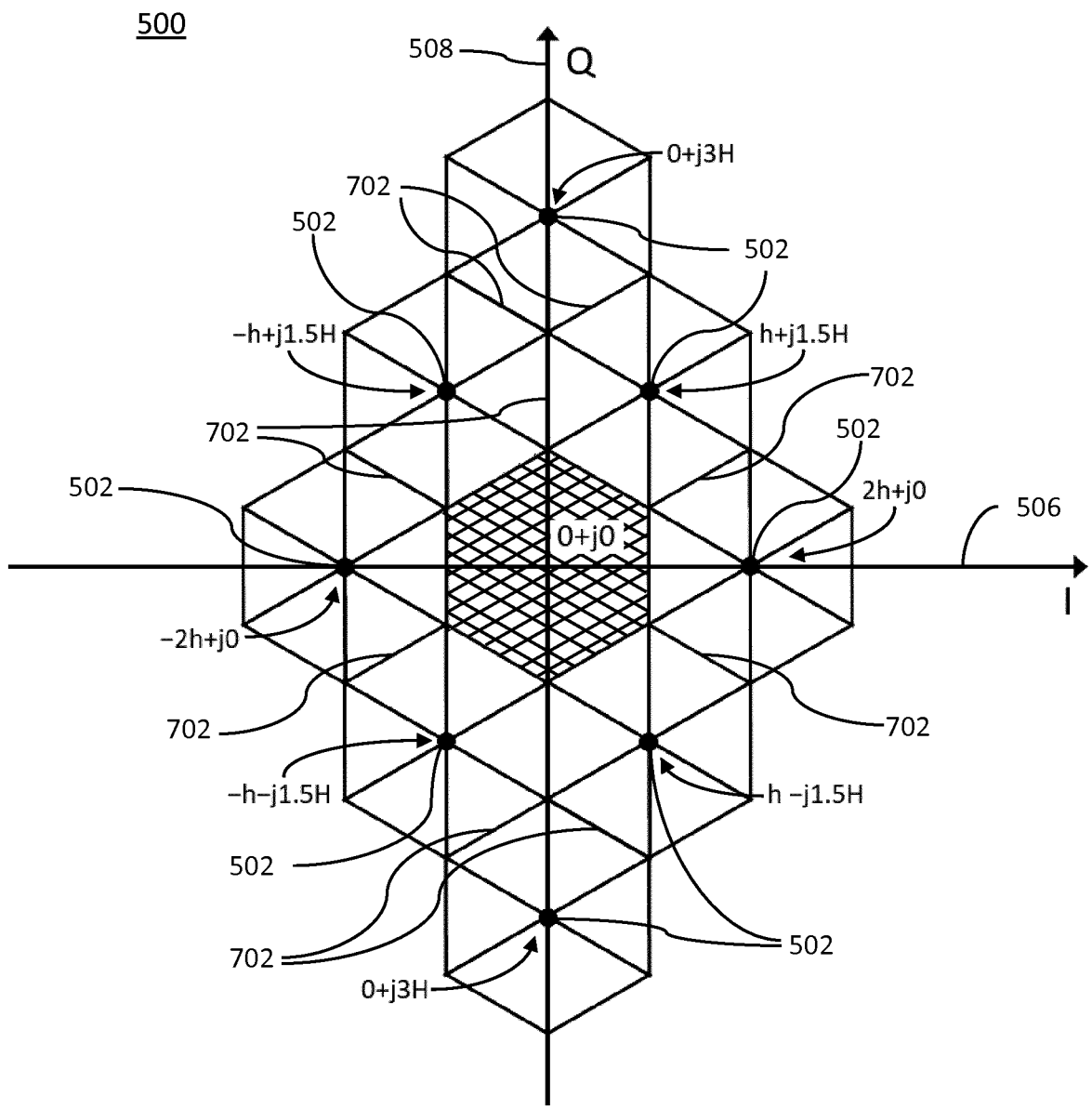
FIG. 7 schematically illustrates decision boundaries for the modulation symbols according to the second implementation of FIG. 6.

FIG. 7 schematically illustrates the decision boundaries 702 in the constellation plane 500 for n=3. For example, the modulation symbols as schematically illustrated in FIG. 6 may be implemented at the device 100. The decision boundaries 702 between the modulation symbols 502, as schematically illustrated in FIG. 7, may be implemented at the device 200.

For the hexagon lattice comprising regular triangles, a possible relation between the in-phase unit, h, and quadrature unit, H, for the in-phase value and quadrature value, respectively, is $$h = \frac{\sqrt{3}}{2} H.$$

Furthermore, the quadrature unit, H, may correspond to the edge length of the regular triangles. In any implementation, H may be set to one (i.e., 1).

Figure 8:
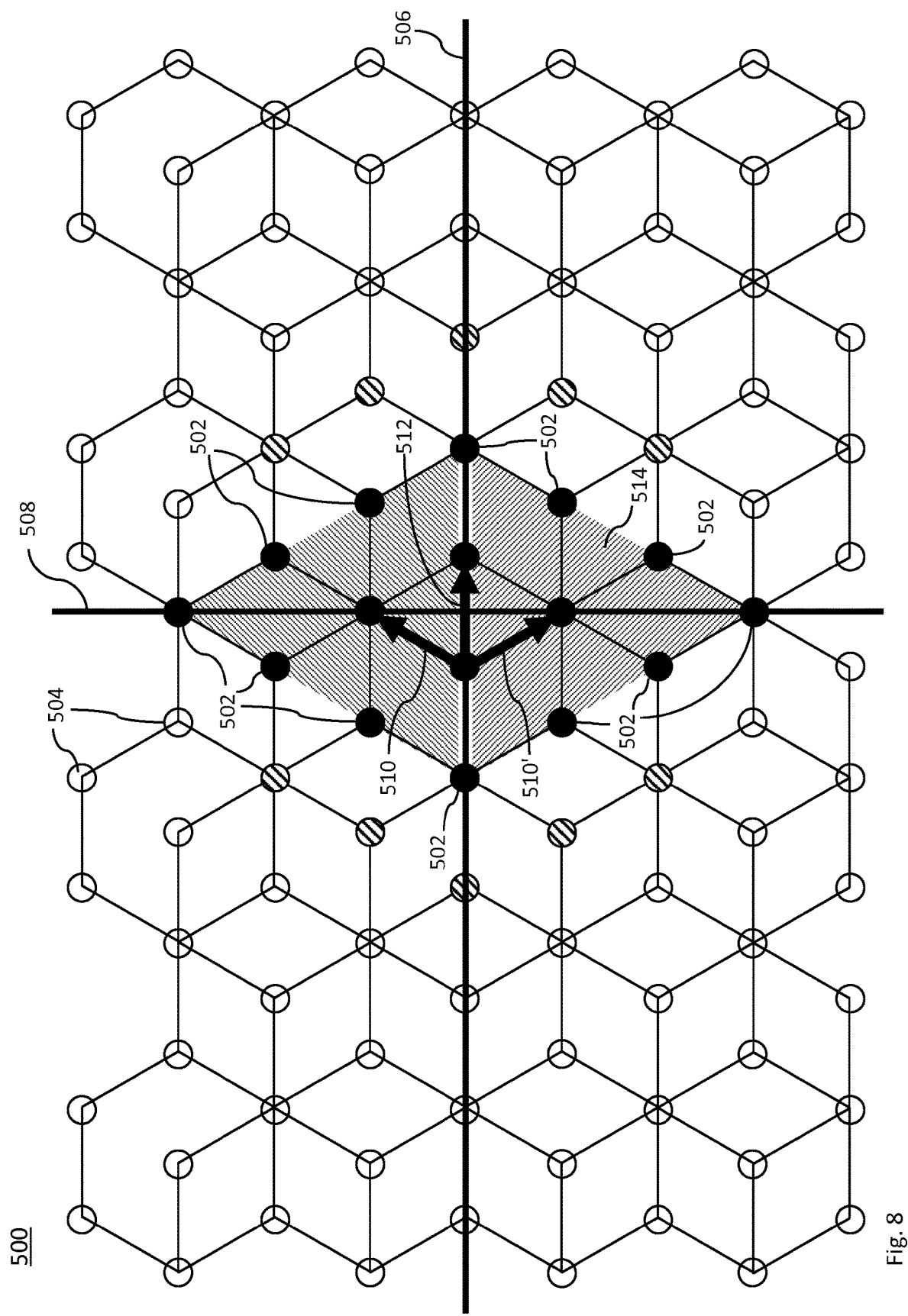
FIG. 8 schematically illustrates modulation symbols in a constellation plane according to a third implementation of the technique.

FIG. 8 schematically illustrates a constellation plane 500 representing the modulation symbols 502 according to a third implementation of the technique for n=4 bits of data. The I values are plotted from left to right. The Q values are plotted from bottom to top. The modulation symbols 502 are arranged symmetrically with respect to both the I-axis 506 and the Q-axis 508.

The modulation alphabet comprises $2^n=16$ modulation symbols 502. This constellation of modulation symbols 502 defining a modulation alphabet is also referred to as 16-star modulation. In the constellation plane 500, the modulation symbols 502 of the modulation alphabet correspond to a subset of a hexagonal lattice 504. Two basis vectors 510 and 512 span the hexagonal lattice. That is, the hexagonal lattice is a two-dimensional Bravais lattice including all integer combination of the two basis vectors 510 and 512. The hexagonal lattice is shifted relative to the DC component, (I, Q)=(0, 0), by half of one of the basis vectors, e.g., the basis vector 512 in FIG. 8. Other combinations of two basis vectors can span the same hexagonal lattice.

The convex hull of the modulation symbols 502 is a rhombus 514.

The n=4 bits of data may be mapped to the modulation symbols 502 according to a two-dimensional Gray code in the directions of two basis vectors. In order to directly apply the two-dimensional Gray code, the basis vectors 510 and 510' that are parallel to the edges of the rhombus 514 are used. In the example of FIG. 8, the two-dimensional Gray code may be applied to the modulation alphabet, wherein the two dimensions of the Gray code are mapped in the step 302 to the basis vector 510 and 510', respectively. The basis vector 510' is related to the basis vector 512 by subtracting the basis vector 510 from the basis vector 512.

For example, the $2^n=16$ modulation symbols 502 may be associated with the bit sequence [1000] at the greatest Q-value (i.e., at the top of the rhombus 514 in FIG. 8); from left to right in the second row of the rhombus 514 with the bit sequences [1100] and [1001]; from left to right in the third row of the rhombus 514 with the bit sequences [0100], [1101] and [1011]; from left to right on the I-axis 506 with the bit sequences [0000], [0101], [1111] and [1010]; from left to right in the fifth row of the rhombus 514 with the bit sequences [0001], [0111] and [1110]; from left to right in the sixth row of the rhombus 514 with the bit sequences [0011], [0110]; and at the least Q-value (i.e., at the bottom of the rhombus 514) with the sequence [0010].

Figure 9:
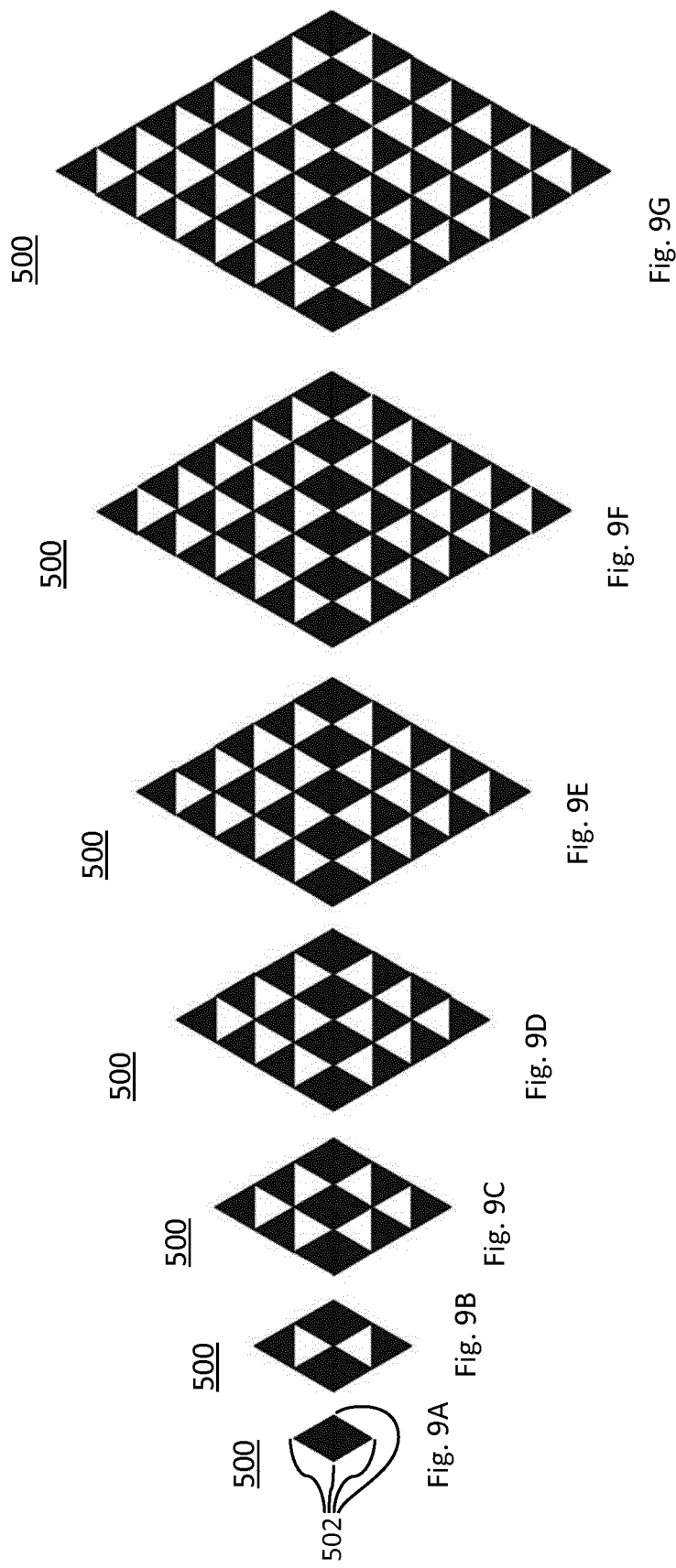
FIG. 9A to 9G schematically illustrates a comparison between different modulation alphabets in a constellation plane.

Each of FIGS. 9A to 9G schematically illustrates a constellation plane 500 for a star-like modulation with the orders (i.e., the sizes in terms modulation symbols) being 4, 8, 16, 24, 36, 48 and 64, respectively. The constellation planes 500 in FIGS. 9D, 9E and 9F are comparative examples, since the number of modulation symbols 502 in the modulation alphabet is not a power of two. This is also an explanation why a 32-star modulation does not exist.

FIGS. 9A, 9B and 9C correspond to the first, second and third implementations, respectively. FIG. 9G corresponds to a fourth implementation of the technique for $2^n=64$.

Figure 10:
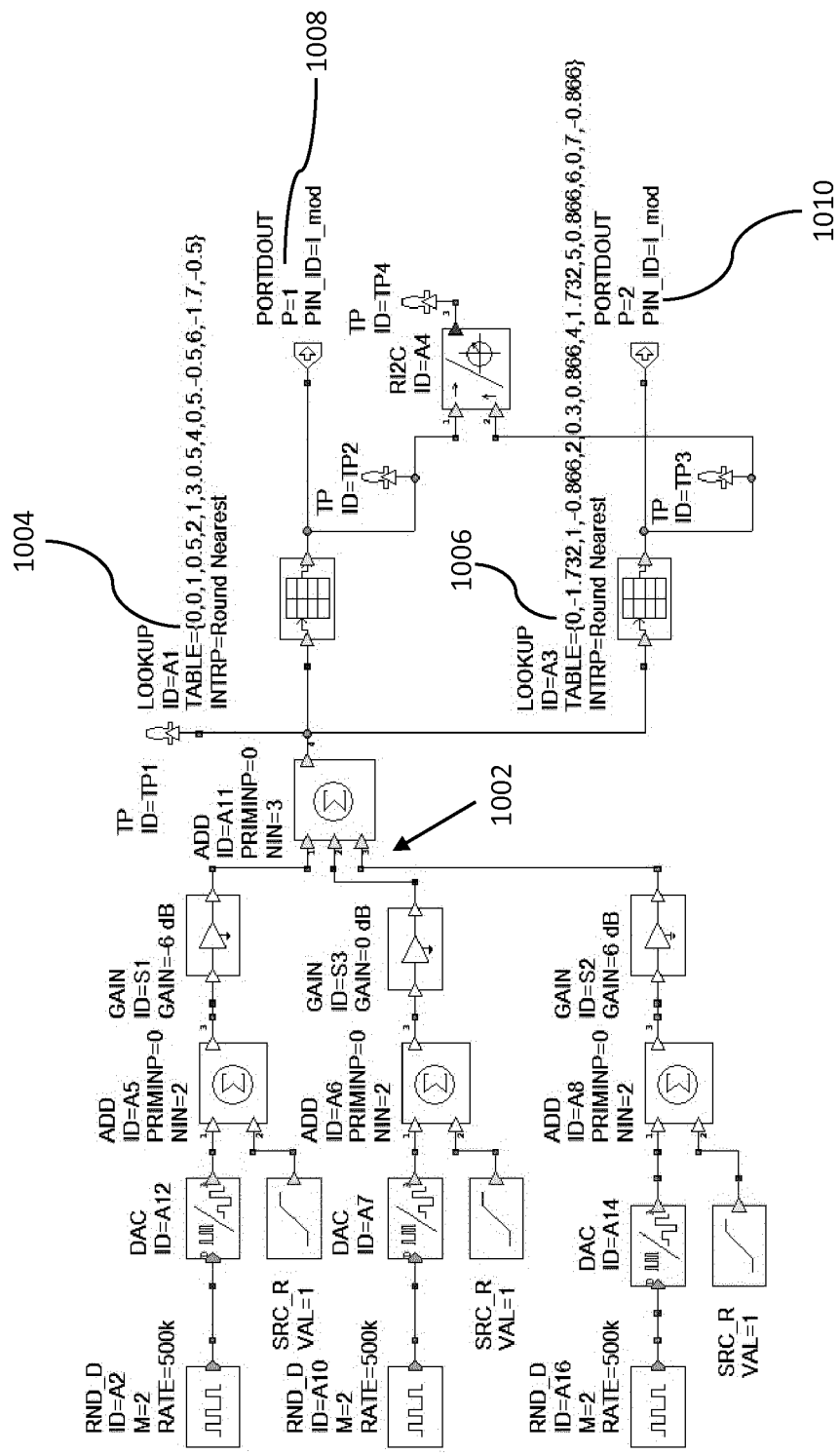
FIG. 10 shows a schematic block diagram of an embodiment of the device of FIG. 1, which is combinable with embodiments and implementations of FIGS. 2 to 9.

FIG. 10 shows a schematic block diagram for an embodiment of the device 100 according to the second implementation, i.e., for n=3. For demonstrating a maximum entropy data transfer, the data to be transmitted is generated by three random number generators (RND), as illustrated on the left-hand side of FIG. 10. In a user implementation, the points in the signaling chain corresponding to random number generators can be connected to high layers of communication protocol stack.

Each piece of data 1002 comprising the three bits to be transmitted defines an index, k=0, . . . , 7, into each of a first table 1004 and a second table 1006 comprising the I and Q values, respectively, of all modulation symbols 502 in the modulation alphabet. For example, as illustrated in FIG. 10, the tables 1004 and 1006 may be structured as lists, wherein the odd entries in the list are the index associated with the subsequent even entry in the same list representing the I and Q values, respectively. More specifically, the modulation symbols 502 represented by the tables 1004 and 1006 correspond to data 1002, i.e., an index, increasing counter-clockwise starting from the modulation symbols 502 with the least Q value.

The I value and the Q value corresponding to the mapped modulation symbol is output at pins 1008 and 1010, respectively, according to the step 304.

The modulation according to the method 300 for implementing the device 100, and the demodulation according to the method 400 for implementing the device 200, can be realized by traditional system elements. Such traditional system elements may encompass those represented by existing electrodynamic simulation or engineering software, which provides a computer-based environment for the design of hardware for wireless and high speed digital products.

Figure 11A:
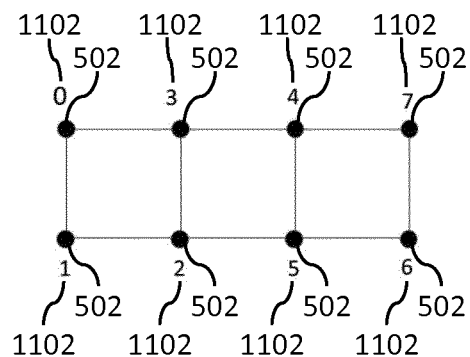
FIG. 11A schematically illustrates a constellation plane for a comparative example.
Figure 11B:
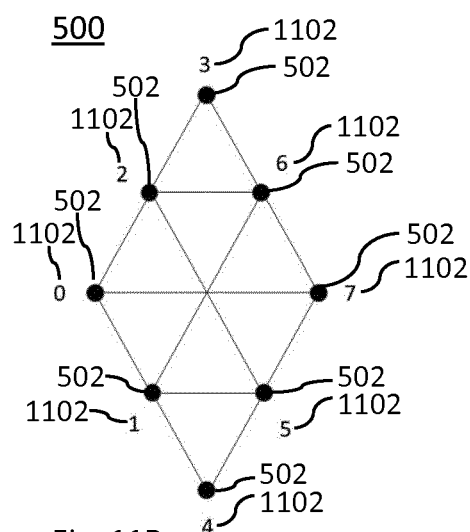
FIG. 11B schematically illustrates an example constellation plane for the second implementation.
Figure 11C:
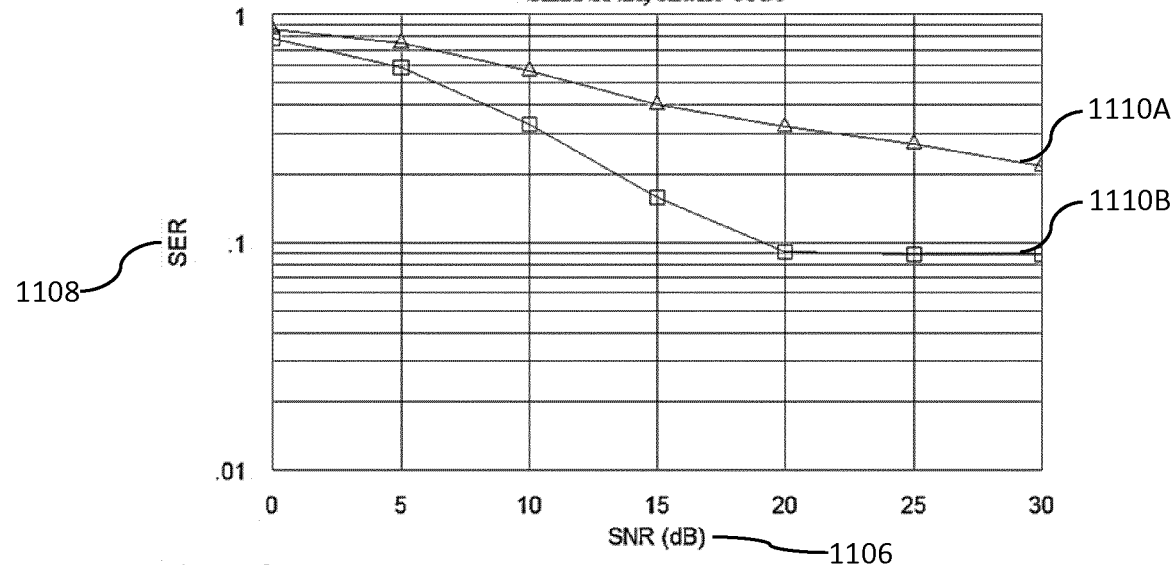
FIG. 11C shows a schematic diagram for the bit error rate as a function of the signal to noise ratio.

FIGS. 11A to 11C schematically illustrate the increase in performance for a second implementation of the modulation technique (i.e., the 8-star modulation) as compared to a conventional 8-QAM implementation. FIGS. 11A and 11B schematically illustrate the constellation planes of the conventional 8-QAM and the 8-star modulation, respectively.

Both the conventional 8-QAM modulation in FIG. 11A and the 8-star modulation in FIG. 11B use a snake code for mapping the digital data 1002 to the modulation symbols 502, i.e. for the step 302 in the case of FIG. 11B. More specifically, indices 1102 correspond to the value of the digital data that is represented by the associated modulation symbol 502.

FIG. 11C shows a schematic diagram 1104 including a curves 1110A and 1110B for the BER 1108 plotted on the vertical axis (using a logarithmic scale) as a function of the SNR 1106 (also using a logarithmic scale since the SNR 1106 is plotted in units of dB) for the 8-QAM and the 8-star modulation, respectively. As is evident from FIG. 11C, this implementation of the 8-star modulation outperforms the conventional 8-QAM at all SNR levels.

While the performance of the modulation technique has been demonstrated for concreteness for the case n=3, other number of bits and/or other codes can be used in the step 302. Such codes include, for example, a Gray code, a right-down code, a clockwise code and a skip-max code. The right-down code may correspond to a path in the 8-QAM constellation diagram starting with the modulation symbol 502 at the upper left corner, traversing diagonally to the next right-down modulation symbol 502, and continuing vertically up to the modulation symbol 502 in the same column at the first row. For the 8-star modulation, the right-down code may correspond to clockwise code with interleaving 1:2 (i.e., a clockwise code with a skip factor of 1), e.g., starting at the most left modulation symbol 502.

While FIG. 11C illustrates the increase in performance of the modulation technique using the snake code for n=3 bits, similar improvements have been observed using other codes in the mapping step 302 and the de-mapping step 404.

Figure 12:
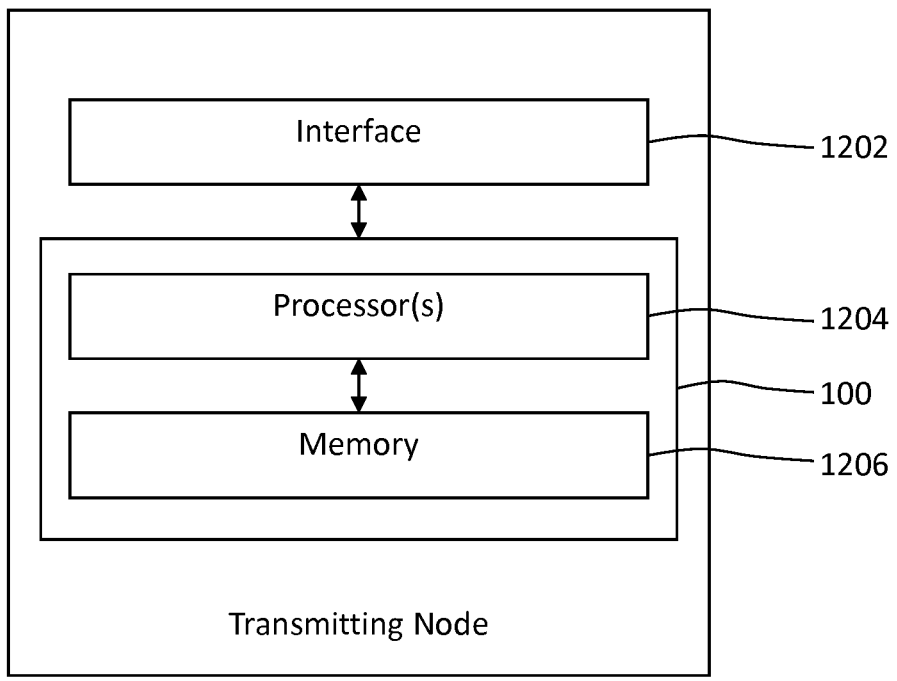
FIG. 12 shows a schematic block diagram of an embodiment of the modulation device in a transmitting node, which is combinable with embodiments and implementations of FIGS. 1 to 11.

FIG. 12 shows a schematic block diagram for an embodiment of the device 100. The device 100 comprises one or more processors 1204 for performing the method 300 and memory 1206 coupled to the processors 1204. For example, the memory 1206 may be encoded with instructions that implement at least one of the modules 102 and 104.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide data transmitter functionality, either alone or in conjunction with other components of the device 100, such as the memory 1206. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by a transmitting node 1200, e.g., a UE or a base station of the RAN. The transmitting node 1200 comprises a radio interface 1202 coupled to the device 100 for radio communication with one or more other nodes, e.g., a receiving node.

In a variant, the functionality of the device 100 is provided by one or more other nodes (e.g., of the RAN or a core network linked to the RAN). That is, the one or more other nodes perform the method 300. The functionality of the device 100 is provided by these one or more nodes to the transmitting node 1200, e.g., via the interface 1202 or a dedicated wired or wireless interface.

Figure 13:
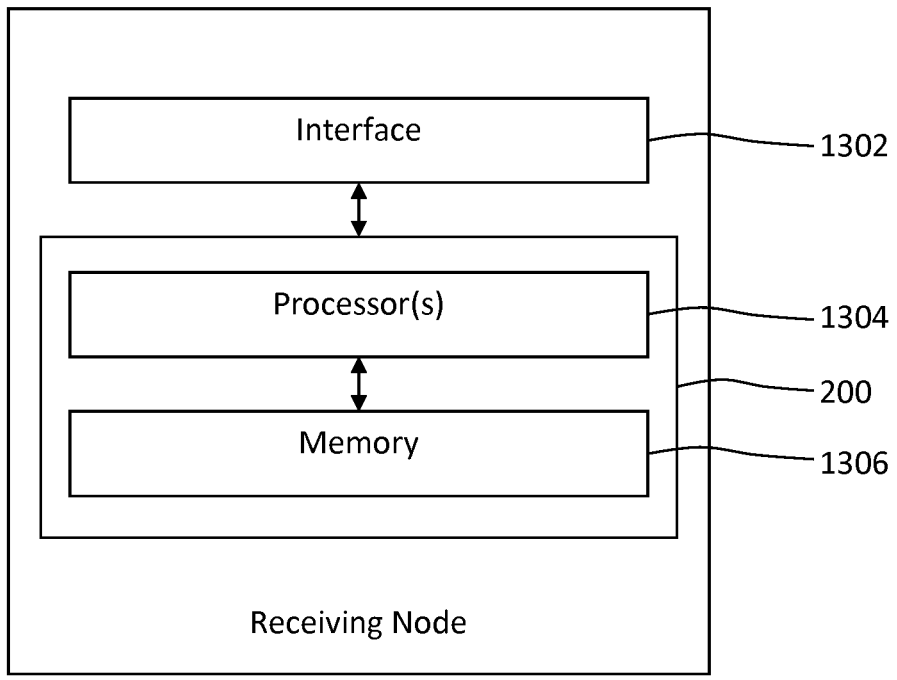
FIG. 13 shows a schematic block diagram of an embodiment of the demodulation device in a receiving node, which is combinable with embodiments and implementations of FIGS. 1 to 12.

FIG. 13 shows a schematic block diagram for an embodiment of the device 200. The device 200 comprises one or more processors 1304 for performing the method 400 and memory 1306 coupled to the processors 1304. For example, the memory 1306 may be encoded with instructions that implement at least one of the modules 202 and 204.

The one or more processors 1304 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide data receiver functionality, either alone or in conjunction with other components of the device 200, such as the memory 1306. For example, the one or more processors 1304 may execute instructions stored in the memory 1306. Such functionality may include providing various features and steps discussed herein, including any of the benefits disclosed herein. The expression "the device being operative to perform an action" may denote the device 200 being configured to perform the action.

As schematically illustrated in FIG. 13, the device 200 may be embodied by a receiving node 1300, e.g., a UE or a base station of the RAN. The receiving node 1300 comprises a radio interface 1302 coupled to the device 200 for radio communication with one or more other nodes, e.g., a transmitting node.

In a variant, the functionality of the device 200 is provided by one or more other nodes (e.g., of the RAN or a core network linked to the RAN). That is, the one or more other nodes perform the method 400. The functionality of the device 200 is provided by these one or more nodes to the receiving node 1300, e.g., via the interface 1302 or a dedicated wired or wireless interface.

The above and further embodiments of the technique can achieve an improvement of the signal-to-noise ratio (SNR) in the sense that erroneous decisions on received bits, i.e., the bit error rate (BER), can be reduced. Such an improvement is of importance in many aspects of digital communication. The SNR is the highest if the probability of the erroneous decision is the smallest. The presented modulation technique, which may be referred to as star modulation, can achieve such a reduction in the probability of erroneous decisions, i.e. a reduction of the BER.

By way of example, realistic numerical simulations of the modulation according to the second implementation (i.e., the 8-star modulation for $2^n=8$) show that the probability of erroneous decisions, i.e., the BER, can be improved with respect to the 8-QAM by 0.385 dB. That means, the improvement of the SNR in this range of the probability of erroneous decisions is 11 dB.

As compared to existing constellation diagrams, such as rectangular QAM, the star modulation can increase the density of the modulation symbols in the constellation plane for a given energy limit, e.g. to the densest possible constellation. Therefore, the SNR can be improved by the star modulation.

Moreover, existing hexagonal QAM, e.g., according to K. Engdahl and K. Sh. Zigangirov in "A Comparison Analysis of Hexagonal Multilevel QAM and Rectangular Multilevel QAM", Probl. Peredachi Inf., 1998, Volume 34, Issue 4, Pages 39-50, shifts the modulation alphabet by a full basis vector resulting in a constellation that is not symmetric with respect to the DC component and includes the DC component. As compared to such a known hexagonal QAM, the star modulation omits the center point of the constellation plane, i.e., the DC component, which results in a better transmission spectrum. Furthermore, a symmetric arrangement of the modulation symbols can avoid an unnecessary exploitation of the power amplifier of the system.

Implementing the constellation presented herein, e.g., the 8-star digital modulation according to the second implementation, the probability of erroneous decision can be reduced by 0.385 dB compared to 8-QAM with comparable conditions. Furthermore, the measured transmission spectrum for an 8-star modulation that is symmetric with respect to both I and Q-axes can be better than that for a shifted modulation alphabet, i.e., a modulation alphabet that is asymmetric with respect to the DC component in the constellation plane.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing digital modulation, the method comprising:
   mapping n bits of data to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of a signal, wherein the $2^n$ modulation symbols are in a rhombus, and wherein all modulation symbols are spaced apart in the constellation plane from a direct current (DC) component corresponding to zero in-phase value and zero quadrature value; and
   outputting the signal corresponding to the mapped modulation symbol.

2. The method of claim 1, wherein the DC component corresponds to the center of the rhombus.

3. The method of claim 1, wherein the modulation alphabet is symmetric in the constellation plane with respect to an in-phase axis through the DC component and/or a quadrature axis through the DC component.

4. The method of claim 1, wherein the mapping uses a Gray code.

5. The method of claim 1, wherein each of the modulation symbols in the modulation alphabet has at least two next-neighboring modulation symbols in the constellation plane, which differ by only one of the n bits.

6. The method of claim 1, wherein at least half of the next-neighboring modulation symbols of each of the modulation symbols in the modulation alphabet differ by only one of the n bits.

7. The method of claim 1, wherein the next-neighboring modulation symbols of each of the modulation symbols in the modulation alphabet differ by only one or two of the n bits.

8. The method of claim 1, wherein the modulation alphabet corresponds to a finite subset of a hexagonal Bravais lattice.

9. The method of claim 8, wherein the Bravais lattice is spanned by two basis vectors in the constellation plane.

10. The method of claim 9, wherein n is even and the triangular lattice is shifted relative to the DC component by half of one of the basis vectors.

11. The method of claim 9, wherein the mapping uses a two-dimensional Gray code along the two basis vectors.

12. The method of claim 9, wherein next neighbors of the modulation symbols in the constellation plane along the two basis vectors differ by only one of the n bits.

13. The method of claim 1, wherein the DC component corresponds to a midpoint between two next-neighboring modulation symbols.

14. The method of claim 1, wherein the DC component corresponds to a node of the hexagonal lattice.

15. A method of performing digital demodulation, the method comprising:
   receiving a signal corresponding to n bits of data; and
   mapping the received signal to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of the signal, and wherein all modulation symbols are spaced apart in the constellation plane from a direct current (DC) component corresponding to zero in-phase value and zero quadrature value.

16. The method of claim 15, wherein the mapping is based on decision lines in the constellation plane according to a Voronoi tessellation of the hexagonal lattice.

17. The method of claim 16, wherein a tile of the Voronoi tessellation including the DC component is not mapped to any of the modulation symbols.

18. A device for performing digital modulation, the device comprising:
   processing circuitry;
   memory containing instructions executable by the processing circuitry whereby the device is operative to:
      map n bits of data to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of a signal, wherein the $2^n$ modulation symbols are in a rhombus, and wherein all modulation symbols are spaced apart in the constellation plane from a direct current, DC, component corresponding to zero in-phase value and zero quadrature value; and
      output the signal corresponding to the mapped modulation symbol.

19. A device for performing digital demodulation, the device comprising:
   processing circuitry;
   memory containing instructions executable by the processing circuitry whereby the device is operative to:
      receive a signal corresponding to n bits of data; and
      map the received signal to one modulation symbol out of a modulation alphabet comprising $2^n$ modulation symbols, wherein the modulation alphabet corresponds to a finite subset of a hexagonal lattice in a constellation plane spanned by an in-phase value and a quadrature value of the signal, and wherein all modulation symbols are spaced apart in the constellation plane from a direct current, DC, component corresponding to zero in-phase value and zero quadrature value.

* * * * *